US00RE34382E

United States Patent [19]

Newnan

[11] E Patent Number: Re. 34,382

[45] Reissued Date of Patent: Sep. 21, 1993

[54] BEAN AND GROUND COFFEE CARRIER MEMBER FOR USE IN COFFEE SYSTEMS

[75] Inventor: Brian D. Newnan, Louisville, Ky.

[73] Assignee: Grindmaster Corporation, Louisville, Ky.

[21] Appl. No.: 894,513

[22] Filed: Jun. 4, 1992

Related U.S. Patent Documents

Reissue of:

[64] Patent No.: 4,955,510
Issued: Sep. 11, 1990
Appl. No.: 342,247
Filed: Apr. 20, 1989

U.S. Applications:

[63] Continuation of Ser. No. 694,641, May 2, 1991, abandoned.

[51] Int. Cl.[5] ..... B65D 88/54

[52] U.S. Cl. ..... 222/307; 222/362; 99/289 R

[58] Field of Search ..... 222/361, 362, 344, 438, 222/437, 305, 307, 267; 221/268; 99/286, 289 R

[56] References Cited

U.S. PATENT DOCUMENTS

| | | | |
|---|---|---|---|
| 199,933 | 2/1878 | Reed | 222/267 |
| 470,018 | 3/1892 | Strong | 222/361 |
| 1,880,753 | 10/1932 | Brand | 222/380 |
| 1,980,057 | 11/1934 | Horkavi | 221/104 |
| 2,795,355 | 6/1957 | Somoza | 222/25 |
| 2,827,845 | 3/1958 | Richeson | 99/289 |
| 3,327,615 | 6/1967 | Swan | 99/286 |
| 3,347,425 | 11/1967 | Beushausen et al. | 229/305 |
| 3,738,507 | 6/1973 | Livingston | 214/16 R |
| 3,967,546 | 7/1976 | Caillot | 99/286 |
| 4,149,658 | 4/1979 | Teufel | 222/267 |
| 4,175,679 | 11/1979 | Ponce | 222/70 |
| 4,188,863 | 2/1980 | Grossi | 99/286 |
| 4,399,931 | 8/1983 | Maddalena | 222/282 |
| 4,779,521 | 10/1988 | Brumfield | 99/289 R |

FOREIGN PATENT DOCUMENTS 659937 5/1936 Fed. Rep. of Germany .

*Primary Examiner*—Robert P. Olszewski
*Assistant Examiner*—Kenneth Noland
*Attorney, Agent, or Firm*—Vance A. Smith

[57] ABSTRACT

A coffee grinder assembly including a housing, a coffee bean hopper, a motorized grinder and at least one bean carrier member containing a chamber having a predetermined volume slidably disposed in the housing between a retracted position wherein the chamber communicates with the hopper and is isolated from the grinder and an extended position wherein the chamber communicates with the grinder and is isolated from the hopper. The member contains an inlet aperture for communication between the chamber and the hopper when in the first position and an outlet aperture for communication between the chamber and the grinder when in the second position. The chamber contains a floor which slopes downwardly toward the outlet aperture at a negative angle which is greater than the angle of repose of coffee beans to promote the flow of coffee beans from the chamber to the grinder. A flap or lever pivotally connected to the housing is pivoted into contact with a grinder motor starting switch to start the grinder when the member moves from the first to the second position. A spring attached to a rear wall of the housing moves the member slightly forwardly away from the second position to relieve the pressure of the lever from the switch to open the switch after it has been closed so that the grinder will shut down after its timing circuit deactivates the grinder but not so far forwardly as to interrupt communication between the chamber and the grinder.

36 Claims, 2 Drawing Sheets

BEAN AND GROUND COFFEE CARRIER MEMBER FOR USE IN COFFEE SYSTEMS

Matter enclosed in heavy brackets [ ] appears in the original patent but forms no part of this reissue specification; matter printed in italics indicates the additions made by reissue.

*This is a continuation of application Ser. No. 07/694,641 filed May 2, 1991, now abandoned and a Reissue of Ser. No. 07/342,247 filed Apr. 20, 1989 now U.S. Pat. No. 4,955,510.*

BACKGROUND OF THE INVENTION

This invention relates generally to means for delivering a predetermined volume of coffee beans to a grinder and to means for delivering a predetermined quantity of ground coffee to coffee brewing apparatus.

Such means are, generally speaking, well known in the prior art. As to coffee bean dispensers, see, for example, U.S. Pat. No. 2,827,845 issued to S. E. Richeson on Mar. 25, 1958 which discloses means for delivering a preselected volume of whole coffee beans to a grinder. This device contains an adjustable sidewall for delivering beans from an intermediate chamber to a grinder which is operated manually by a see-saw arm to close an upper plate to seal off a hopper from the chamber while opening a lower plate to release a measured quantity of beans from the chamber to the grinder and vice versa. See also U.S. Pat. No. 3,967,546 issued to S. Cailliot on Jul. 6, 1976; U.S. Pat. No. 4,188,863 issued to L. Grossi on Feb. 19, 1980; and U.S. Pat. No. 3,327,615 issued to W. S. Swan on Jun. 27, 1967 which disclose still other examples of devices for the precision metering of coffee beans to grinders.

As to ground coffee metering apparatus, see U.S. Pat. No. 4,779,521 issued to W. L. Brumfield on Oct. 25, 1988. In this system, a brewing receptable is removably connected to a U-shaped plate so as to be movable with the plate as the latter slides back and forth to meter out ground coffee. The coffee is dispensed from a hopper through a vertical chute onto the sliding plate and spills under a vertically adjustable forward plate or lip into the receptacle. A knob is used to raise and lower the lip to increase or decrease the rate of flow of the coffee as it spills into the receptacle. A tension spring biases the sliding plate and receptacle toward a forward position in the housing of the system. The receptacle handle is manually pushed rearwardly in opposition to the spring bias to meter coffee into the receptacle.

These prior art assemblies are relatively complex in construction. Also, they do not make allowance for the bridging of coffee across an outlet caused by the flow resistance of either ground or whole bean coffee which is expressed in terms of the angle of repose thereof. Moreover, none of these systems are adapted to operate in conjunction with modern coffee grinders which are adapted to operate for a predetermined period of time after starting through the use of well known grinder timing circuits.

By means of my invention, these and other difficulties encountered in prior art whole bean and ground coffee dispensing for metering selected quantities thereof to a grinder or brewer apparatus, respectively, are substantially overcome.

SUMMARY OF THE INVENTION

It is an object of my invention to provide a novel coffee bean carrier member for use in a coffee grinder assembly for delivering a predetermined volume of beans to a grinder of the assembly.

It is a further object of my invention to provide means for delivering a predetermined quantity of ground coffee from a ground coffee source to a brewing means such as a brew basket or the like.

It is yet another object of my invention to provide a coffee bean and ground coffee carrier member for delivering a predetermined volume of either coffee beans or ground coffee to a grinder or brew basket, respectively, wherein the volume can be changed.

It is also an object of my invention to provide a coffee bean carrier member for a coffee grinder assembly for delivering a predetermined volume of beans to a grinder while, at the same time, operating means for activating the grinder.

Briefly, in accordance with my invention, there is provided a coffee bean proportioning means for a coffee grinder assembly which includes a housing and a motorized grinder disposed in the housing which defines an inlet port for receiving whole beans to be ground. The assembly also includes a bean hopper mounted on the housing which defines an outlet port and a bean carrier member defining a chamber therein for storing a predetermined volume of beans. The member contains an inlet aperture and an outlet aperture and is disposed in the housing for linear movement between a first position wherein the chamber communicates with the hopper through the inlet aperture and is isolated from the grinder and a second position wherein the chamber communicates with the grinder through the outlet aperture and is isolated from the hopper. Lastly, the assembly includes means for moving the member between the first and second positions.

These and other objects, features and advantages of my invention will become apparent to those skilled in the art from the following detailed description and attached drawings upon which, by way of example, only a preferred embodiments of the invention is explained and illustrated.

DESCRIPTION OF THE PREFERRED EMBODIMENT

Figure 2:
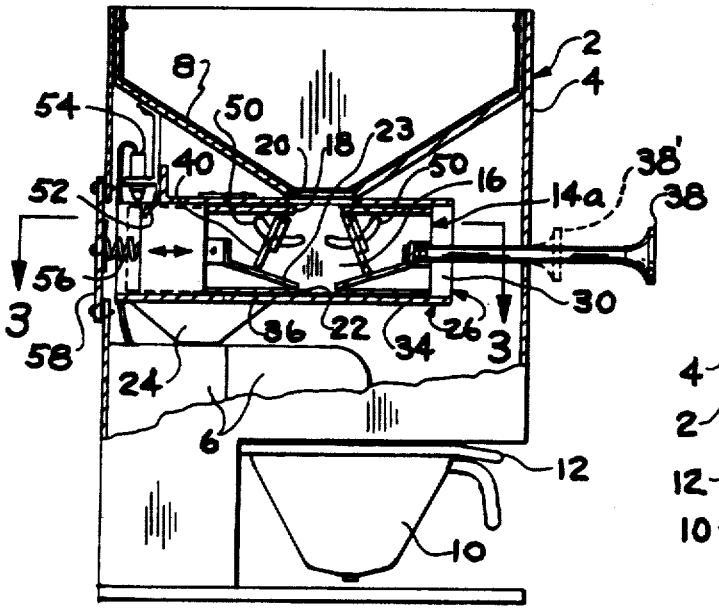
FIG. 2 shows a partially full and partially cross-sectional elevation view of the grinder assembly and bean carrier members of FIG. 1 with the cross-sectional portion being as viewed along cross-section lines 2—2 of the latter figure.
Figure 1:
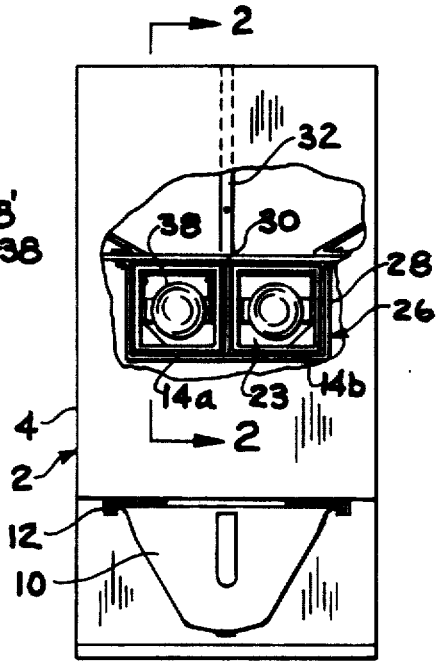
FIG. 1 shows a front elevation view of a grinder assembly for grinding both regular and decaffeinated coffee beans which includes a pair of volume adjustable bean carrier members with a portion of the front cover of the assembly torn away for internal viewing purposes, thus illustrating a preferred embodiment of my invention.

Referring now to the drawing figures, there is shown, in one preferred embodiment of my invention, a coffee grinder assembly 2 which includes a housing 4, a motor operated coffee grinder 6 of any suitable type disposed in a lower end portion of the housing, and a coffee bean storage hopper 8 formed in an upper end portion of the housing. The grinder 6 is positioned so as to deliver ground coffee into a conventional brew basket 10 which is removably connected by means of runners or channels 12 to an underside of the housing 4. When filled with the desired amount of ground coffee, the brew basket 10 can be manually withdrawn from the channels 12 and placed in a coffee brewing apparatus, not shown, for brewing of the coffee, in the usual, well known manner.

The assembly 2 also includes a pair of coffee bean carrier members 14*a* and 14*b*, each of which define a chamber 16 (FIG. 2) adapted to hold a predetermined volume of beans delivered through an inlet aperture 18 from an outlet port 20 of the hopper 8. Each of the carrier members 14*a* and 14*b* also define an outlet aperture 22 located in a sloping floor 23 preferably below its respective inlet aperture 18 for delivering coffee from the chamber 16 to an inlet hopper or port 24 of the grinder. While the inlet and outlet apertures 18 and 22 can be transversely offset from one another if desired, placing them in vertical alignment as in the present example facilitates cleaning and visual inspection of the interior of the members 14*a* and 14*b*. The negative slope of the floor 23 of each of the members 14*a* and 14*b* and the valleys between them should be at least be as great as the angle of repose of the type of coffee beans to be used in the chamber 16 to promote flow of the beans out of the chamber 16 to the grinder 6 when desired. Since the angle of repose of oily whole coffee beans is typically about 22 degrees, I recommend that the negative angle of slope of the valleys of the floors 23 be at least that great. To accomplish this minimum angle of slope of the valleys, the broad surfaces of the floors 23 should preferably be on a negative angle of slope of at least 30 degrees. The members 14 are slidably mounted in a container assembly 26 which is, in turn, connected to and suspended from a lower end portion of the hopper 8.

The members 14*a* and 14*b* are in the form of elongated boxes of rectangular cross-section and are slidably disposed on a floor of the container 26 between side walls 28 and a dividing wall or partition 30. The container 26 is connected to and suspended below the hopper 8. The outlet port 20 and the interior of the hopper 8 are divided into two sections by a vertically extending dividing wall 32 so that both regular and decaffeinated coffee beans can be separately stored and selected for grinding and brewing as desired. A floor 34 of the container 26 defines a rectangular opening 36 over the grinder inlet hopper 24. The opening 36 is transversely offset from the hopper outlet port 20 such that when the members 14*a* and 14*b* are in a first retracted position as shown in full in FIG. 2, the hopper outlet port 20 registers with the inlet apertures 18 so that beans will flow into the chambers 16. In this first retracted position, the chamber 16 communicates with the hopper 8 while the outlet apertures 22 of the members are completely out of registry with the container opening 36, whereby the chambers 16 are isolated from the grinder inlet port 24.

By pushing either of a pair of plungers 38 inwardly to a position as shown in phantom at 38' in FIG. 2, the corresponding member 14*a* or 14*b* will be moved longitudinally rearward in the housing 4 to a second position wherein its corresponding outlet aperture 22 registers with the opening 36 to dump a predetermined volume of beans from the chamber 16 into the grinder inlet hopper 24. Whenever one of the outlet apertures 22 is in communication with the grinder inlet hopper 24, the corresponding inlet aperture 18 should be completely out of registry with the hopper outlet port 20, whereby the corresponding hopper 8 and chamber 16 will be isolated from one another.

The volume of the chambers 16 may be of any predetermined fixed size as desired in order to obtain the desired portion of ground coffee from the grinder 6 for brewing in the basket 10. However, it is particularly advantageous to be able to vary the volume of the chambers 16 to suit the needs of different users as, for example, when grinding different kinds of coffee in successive batches or when providing different batches of ground coffee for brewing at different strengths. This is accomplished in the present example by means of a pair of tiltable end walls 40 located in each of the members 14 on opposite sides of the vertically aligned inlet and outlet apertures 18 and 22. Each of the end walls 22 are tiltable or pivotal about pivot pins 42 which extend through outside and inside flanges 44*a* and 44*b* and sidewalls 46 of the members 14*a* and 14*b*. Pins 48 located below each of the pivot pins 42 are fixedly attached to each of the flanges 44*b* and extend through a different circular, arcshaped slot 50 in the inner sidewalls 46 of the members 14*a* and 14*b*. The pins 48 friction fit within the slots 50 to permit manual adjustment of the inclination of the end plates 40 to change the volume of the chamber 16, whereby the pins 48 will travel along the arc of the slots 50 as the plates 40 are tiltably adjusted. Otherwise, when not being adjusted, the pins 48 hold their positions in the slots 50 by friction to maintain the end walls 40 at the desired angle of tilt. To promote the complete filling of the chambers 16 with beans, I recommend that the acute angle of tilt of the plates 40 relative to horizontal never be adjusted so as to be less than the typical angle of repose of the beans to be carried therein. The upper extent of the slots 50 may be established at this minimum angle relative to horizontal to assure that such an adjustment can not be made.

Figure 3:
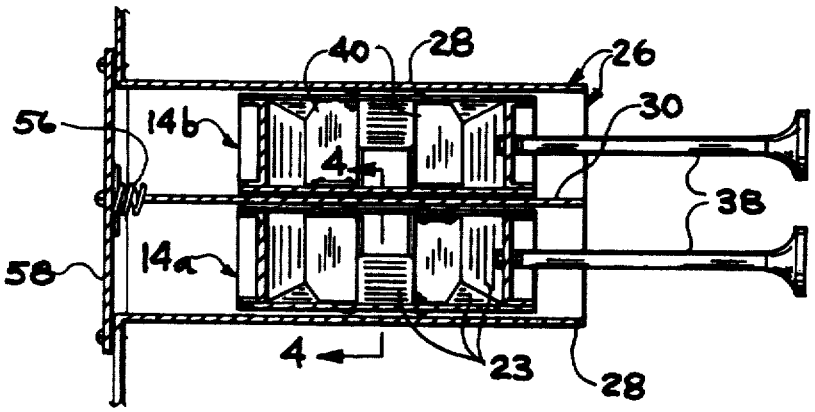
FIG. 3 shows a cross-sectional plan view of the bean carrier members of FIGS. 1-2 as viewed along cross-section lines 3—3 of FIG. 2 and with certain missing parts of FIG. 2 replaced.
Figure 4:
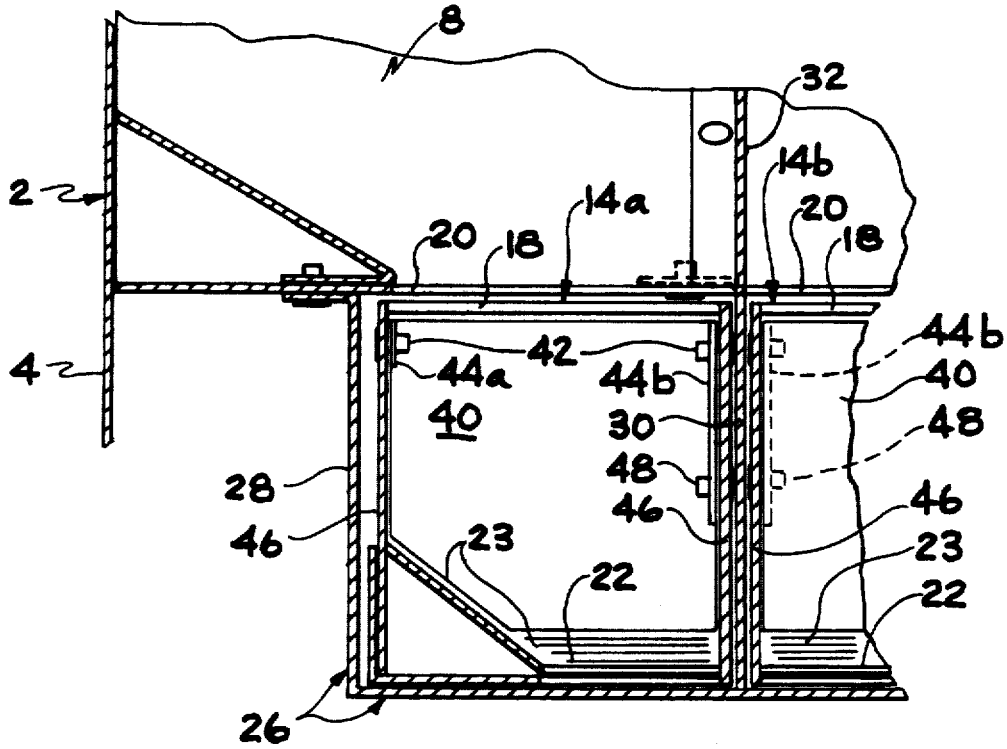
FIG. 4 shows a cross-sectional elevation view of a portion of the grinder assembly and bean carrier members of FIGS. 1-3 as viewed along cross-section lines 4—4 of FIG. 3 and with certain missing parts of FIG. 3 replaced.
Figure 5:
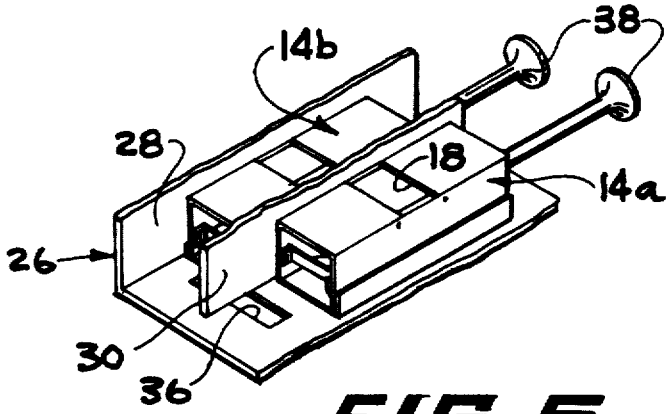
FIG. 5 shows a perspective view of the bean carrier members of FIGS. 1-3.
Figure 6:
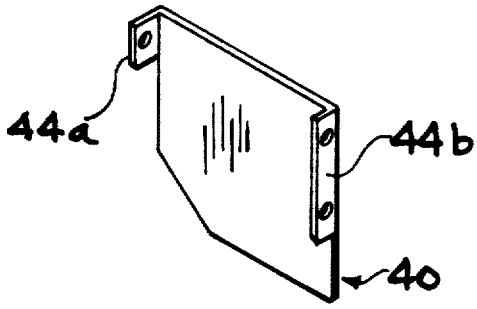
FIG. 6 shows a perspective view of one of the tiltable end plates contained in the bean carrier members of FIGS. 1-5 for permitting adjustment in the volume of whole beans to be carried in the members.
Figure 7:
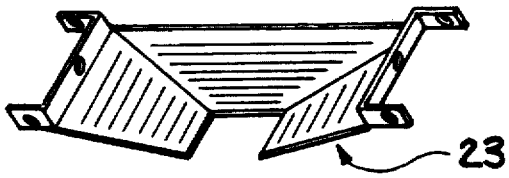
FIG. 7 shows a perspective view of a sloping floor disposed in each of the members of FIGS. 1-5.

Referring now particularly to FIGS. 2-3, it will be observed that, as the plunger 38 and member 14*a* are pushed rearwardly in the container 26 to dump beans from the chamber 16 through the opening 36 into the grinder 6, an upper inside edge portion of the member 14*a* contacts a lever 52 (FIG. 2) which is pivotally attached on an upper end portion thereof to an upwardly extending rear end portion of the container 26. Such contact forces the free end of the lever 52 to tilt upwardly to depress a spring return grinder motor start switch 54 to activate the grinder 6. Typically, coffee grinders of the prior art utilize a spring return motor start switch as part of a latching and timer circuit, whereby momentary closure of the start switch activates a relay operated latching circuit which maintains an operating potential on the grinder motor until a timer device opens following a preselected time sufficient to complete the grinding operation, even though the start switch has returned to the off position following momentary closure. Latching and timer circuits for accomplishing this result are well known in the coffee grinding prior art and are suitable for use with the grinder assembly of the present example. However, it is necessary when employing such latching and timer circuitry to provide means for disabling the grinder motor activating means or lever 52 following the momentary closure of the switch 54 so that the switch 54 will not remain closed to keep the grinder in operation after the timer circuit opens. Should this happen, the grinder 6 will continue to run so long as one of the members 14*a* or 14*b* remains in the full rearward position in the housing 4.

One such disabling means is shown in the present example and includes a coiled spring 56 mounted on a removable back plate 58 so as to project against a rear edge of the dividing wall 30. Under such conditions, the spring 56 is held in a slight degree of compression. Now, as one of the members 14*a* or 14*b* moves rearwardly sufficiently to engage the lever 52 to close the switch 54, the spring 56 is further depressed by an inside edge of the sidewall of the member. Upon release of the corresponding plunger 38, the now fully compressed spring 56 expands and urges the member 14*a* slightly forwardly in the housing 4 sufficient to allow the lever 52 to drop away from and disengage the start switch 54 but not so far forwardly as to interrupt communication between the chamber 16 and grinder inlet port 24 through the opening 36 and the corresponding outlet aperture 22. As a result, the motor start switch 54 is immediately allowed to open following its closure by the lever 52 upon release of the corresponding plunger 38 by the operator.

While the present example of the invention illustrates the use of two bean carrier members in a single grinder assembly, it will be appreciated that only one such bean carrier member may be employed if desired. Similarly, any desired number of such members greater than two can also be employed in a side-by-side arrangement although it may be necessary in that case to employ additional biasing springs such as the spring 56, additional spring return motor start switches wired in parallel with and similar to the switch 54, and additional switch activating means or levers similar to the lever 52 to operate the additional switches. In addition, the invention may be used in association with the newer combination grinder/brewer assemblies now available. Moreover, a bean carrier member of the present example may be used as a means for delivering a predetermined quantity of ground coffee directly to brewing means such as the brew basket 10 provided that the negative angle of slope of the floor 23 and its valleys is adjusted so as to be at least as great as the angle of repose of ground coffee placed in the chamber 16. In the case of a ground coffee metering device, I recommend that the negative angle of slope of the floor 23 be about 45 degrees.

Although the present invention has been explained with respect to specific details of a certain preferred embodiment thereof, it is not intended that such details limit the scope and coverage of this patent otherwise than as specifically set forth in the following claims.

I claim:

1. Coffee bean proportioning means for a coffee grinder assembly comprising a housing, a motorized grinder disposed in said housing and defining an inlet port for receiving whole beans to be ground, a bean hopper mounted on said housing and defining an outlet port, a bean carrier member defining a chamber for storing a predetermined volume of beans, said member having an inlet aperture and an outlet aperture and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper, said member further comprising a box partially defining said chamber, said box having upper and lower surfaces defining said inlet and outlet apertures, respectively, and a pair of sidewalls, and a floor formed in said box and sloping downwardly toward defining edge portions of said second aperture, said sloping floor having a negative angle relative to horizontal which is greater than the angle of repose of coffee beans to promote the flow of beans from said chamber through said second aperture to said grinder when said chamber is in communication with said grinder, a pair of end walls pivotally attached to one of said sidewalls and disposed in said member over said floor to define end walls of said chamber on opposite sides of said inlet and outlet apertures, one of said sidewalls containing a pair of circular, are-shaped slots therein, and an adjustment pin connected to each of said end walls, each of said pins projecting through a corresponding one of said slots for being moved along said slots to tilt said end walls and thereby adjust the volume of said chamber, and means for moving said member between said first and second positions.

2. The assembly of claim 1 further comprising means for activating said grinder upon movement of said member from said first to said second position.

3. The assembly of claim 1 wherein said moving means comprises a plunger connected to an end of said member and projecting at least partially out of said housing, said carrier member being linearly translatable between said first and second positions by manual operation of said plunger.

4. The assembly of claim 1 further comprising means for adjusting the volume of said chamber.

5. The assembly of claim 1 wherein said inlet and outlet apertures register with one another vertically, said assembly further comprising a container having a second floor upon which said member is slidably movable, said second floor defining an opening therein aligned above said grinder inlet port such that said outlet aperture opening and grinder inlet port communicate with one another vertically when member is in said second position.

6. The assembly of claim 5 wherein said container is connected to and suspended below said hopper.

7. Coffee bean proportioning means for a coffee grinder assembly comprising a housing, a motorized grinder disposed in said housing and defining an inlet port for receiving whole beans to be ground, a bean hopper mounted on said housing and defining an outlet port, a bean carrier member defining a chamber for storing a predetermined volume of beans, said member having an inlet aperture and an outlet aperture and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper, and means for moving said member between said first and second positions, means for activating said grinder upon movement of said member from said first to said second position, said activating means comprising a motor start switch operatively connected to a motor of said grinder, and means movably mounted in said housing for operating said switch to start said grinder upon contact with said bean carrier member when said member is moved from said first to said second position for delivery of said beans from said chamber to said grinder, and means for disabling said activating means upon activating said grinder for permitting said grinder to shut down at the end of a predetermined time period, said switch operating means comprising a rigid flap pivotally connected on one end portion thereof to said housing such that a free end of said flap activates said switch upon contact with said member when said member is moved into said second position and such that said flap moves away from said switch upon operation of said disabling means.

8. The assembly of claim 7 wherein said moving means comprises a plunger connected to an end of said member and projecting at least partially out of said housing, said carrier member being linearly translatable between said first and second positions by manual operation of said plunger.

9. The assembly of claim 7 further comprising means for adjusting the volume of said chamber.

10. The assembly of claim 7 wherein said member further comprises a box partially defining said chamber, said box having upper and lower surfaces defining said inlet and outlet apertures, respectively, and a pair of sidewalls, and a floor formed in said box and sloping downwardly toward defining edge portions of said second aperture, said sloping floor having a negative angle relative to horizontal which is greater than the angle of repose of coffee beans to promote the flow of beans from said chamber through said second aperture to said grinder when said chamber is in communication with said grinder.

11. The assembly of claim 7 wherein said inlet and outlet apertures register with one another vertically, said assembly further comprising a container having a second floor upon which said member is slidably movable, said second floor defining an opening therein aligned above said grinder inlet port such that said outlet aperture opening and grinder inlet port communicate with one another vertically when said member is in said second position.

12. The assembly of claim 11 wherein said container is connected to and suspended below said hopper.

13. The assembly of claim 7 wherein said disabling means comprises a spring mounted in said housing in a position to be at least partially compressed by said member when said member is moved to said second position sufficient to activate said grinder, said spring being adapted to at least partially relieve its compression by moving said member slightly away from said second position to disable said activating means without interrupting communication between said chamber and grinder inlet port through said second aperture.

14. Coffee bean proportioning means for a coffee grinder assembly comprising a housing, a motorized grinder disposed in said housing and defining an inlet port for receiving whole beans to be ground, a bean hopper mounted on said housing and defining an outlet port, a bean carrier member defining a chamber for storing a predetermined volume of beans, said member having an inlet aperture and an outlet aperture and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper, and means for moving said member between said first and second positions, means for activating said grinder upon movement of said member from said first to said second position, and means for disabling said activating means upon activating said grinder for permitting said grinder to shut down at the end of a predetermined time period, said disabling means comprising a spring mounted in said housing in a position to be at least partially compressed by said member when said member is moved to said second position sufficient to activate said grinder, said spring being adapted to at least partially relieve its compression by moving said member slightly away from said second position to disable said activating means without interrupting communication between said chamber and grinder inlet port through said second aperture.

15. The assembly of claim 14 wherein said moving means comprises a plunger connected to an end of said member and projecting at least partially out of said housing, said carrier member being linearly translatable between said first and second positions by manual operation of said plunger.

16. The assembly of claim 14 further comprising means for adjusting the volume of said chamber.

17. The assembly of claim 14 wherein said member further comprises a box partially defining said chamber, said box having upper and lower surfaces defining said inlet and outlet apertures, respectively, and a pair of sidewalls, and a floor formed in said box and sloping downwardly toward defining edge portions of said second aperture, said sloping floor having a negative angle relative to horizontal which is greater than the angle of repose of coffee beans to promote the flow of beans form said chamber through said second aperture to said grinder when said chamber is in communication with said grinder.

18. The assembly of claim 14 wherein said inlet and outlet apertures register with one another vertically, said assembly further comprising a container having a second floor upon which said member is slidably movable, said second floor defining an opening therein aligned above said grinder inlet port such that said outlet aperture opening and grinder inlet port communicate with one another vertically when said member is in said second position.

19. The assembly of claim 18 wherein said container is connected to and suspended below said hopper.

20. The assembly of claim 14 wherein said activating means comprises a motor start switch operatively connected to a motor of said grinder, and means movably mounted in said housing for operating said switch to start said grinder upon contact with said bean carrier member when said member is moved from said first to said second position for delivery of said beans from said chamber to said grinder.

21. The assembly of claim 20 wherein said switch operating means comprises a rigid flap pivotally connected on one end portion thereof to said housing such that a free end of said flap activates said switch upon contact with said member when said member is moved into said second position and such that said flap moves away from said switch upon operation of said disabling means.

22. Coffee bean proportioning means for a coffee grinder assembly comprising a housing, a motorized grinder disposed in said housing and defining an inlet port for receiving whole beans to be ground, a bean hopper mounted on said housing and defining an outlet port, a bean carrier member defining a chamber for storing a predetermined volume of beans, said member having an inlet aperture and an outlet aperture and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper, means for moving said member between said first and second positions, means for adjusting the volume of said chamber, said adjusting means comprising a pair of end walls pivotally disposed in said member for confining said beans above said second aperture when said chamber is isolated from said grinder, and means attached to said member for tiltably adjusting said end walls to change the volume of said chamber, the minimum negative angle of tilt of each of said end walls relative to horizontal being greater than the angle of repose of said beans to promote the filling of said chamber with beans from said hopper when said chamber is in communication with said hopper through said inlet aperture.

23. The assembly of claim 22 further comprising means for activating said grinder upon movement of said member from said first to said second position.

24. The assembly of claim 22 wherein said moving means comprises a plunger connected to an end of said member and projecting at least partially out of said housing, said carrier member being linearly translatable between said first and second positions by manual operation of said plunger.

25. The assembly of claim 22 wherein said member further comprises a box partially defining said chamber, said box having upper and lower surfaces defining said inlet and outlet apertures, respectively, and a pair of sidewalls, and a floor formed in said box and sloping downwardly toward defining edge portions of said second aperture, said sloping floor having a negative angle relative to horizontal which is greater than the angle of repose of coffee beans to promote the flow of beans from said chamber through said second aperture to said grinder when said chamber is in communication with said grinder.

26. The assembly of claim 22 wherein said inlet and outlet apertures register with one another vertically, said assembly further comprising a container having a second floor upon which said member is slidably movable, said second floor defining an opening therein aligned above said grinder inlet port such that said outlet aperture opening and grinder inlet port communicate with one another vertically when said member is in said second position.

27. The assembly of claim 26 wherein said container is connected to and suspended below said hopper.

28. A portioning device for delivering a preselected portion of ground coffee comprising a housing, means for storing ground coffee mounted in said housing, a carrier member defining a chamber for storing a preselected volume of ground coffee, said member defining an inlet and an outlet aperture communicating with said chamber, said member being disposed in said housing for linear movement between a first position wherein said chamber communicates with said storing means through said inlet aperture and said outlet aperture is closed and a second position wherein said outlet aperture is open and said chamber is isolated from said storing means, a sloping floor disposed in said member having a minimum negative angle of slope at least equal to the angle of repose of ground coffee for promoting the flow of said ground coffee from said chamber to said brew basket, and means for varying the volume of said chamber comprising a pair of end plates disposed in said member on opposite ends of said outlet aperture, said end plates each being pivotally attached to said member so as to be tiltable and containing a pin which extends through an arc-shaped slot in a sidewall of said member, said pin friction fitting in said slot so as to allow the incline of each said end plate to be maintained once set but being movable along said slot to permit manual adjustment in the incline of each said plate as desired.

29. The assembly of claim 28 further comprising means for activating said grinder upon movement of said member from said first to said second position.

30. The system of claim 28 wherein said inlet and outlet apertures are vertically aligned in registry with one another to facilitate cleaning and visual inspection of said member.

*31. A coffee grinder assembly with a coffee bean proportioning apparatus comprising*

*a housing,*

*a motorized grinder disposed in said housing and defining an inlet port for receiving whole beans to be ground,*

*a bean hopper mounted on said housing and defining an outlet port,*

*a bean carrier member having sidewalls and a pair of end walls at least one of which being adjustably tiltable, said carrier member defining a chamber for storing a predetermined volume of beans and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper,*

*means for moving said member between said first and second positions, and*

*means for pivoting said adjustably tiltable end wall to change the volume of said chamber.*

*32. The assembly of claim 31 in which both end walls are pivotally disposed in said member and said pivoting means adjustably tilts both of said end walls.*

*33. The assembly of claim 31 wherein the minimum negative angle of tilt of each of said end walls relative to horizontal is greater than the angle of repose of said beans to promote the filling of said chamber with beans from said hopper when said chamber is in communication with said hopper through said inlet aperture.*

*34. The assembly of claim 31 in which said means for tiltably adjusting is attached to said member.*

*35. The assembly of claim 31 in which said bean carrier member further has a sloping floor.*

*36. Coffee bean proportioning means for a coffee grinder assembly comprising*

*a housing;*

*a motorized grinder disposed in said housing and defining an inlet port for receiving whole beans to be ground;*

*a bean hopper mounted on said housing and defining an outlet port;*

*a bean carrier member defining a chamber for storing a predetermined volume of beans, said member having an inlet aperture and an outlet aperture and being disposed in said housing for linear movement between a first position wherein said chamber communicates with said hopper through said inlet aperture and is isolated from said grinder, and a second position wherein said chamber communicates with said grinder inlet port through said outlet aperture and is isolated from said hopper;*

*means for moving said member between said first and second positions; and*

*means for adjusting the volume of said chamber, said adjusting means comprising a pair of end walls pivotally disposed in said member for confining said beans above said second aperture when said chamber is isolated from said grinder and means attached to said member for tiltably adjusting said end walls to change the volume of said chamber.*

* * * * *